US010650475B2

(12) United States Patent
Berg et al.

(10) Patent No.: US 10,650,475 B2
(45) Date of Patent: May 12, 2020

(54) HIERARCHICAL PANEL PRESENTATION RESPONSIVE TO INCREMENTAL SEARCH INTERFACE

(71) Applicant: HomeAway.com, Inc., Austin, TX (US)

(72) Inventors: Robert Berg, Austin, TX (US); Robert Burns, Austin, TX (US)

(73) Assignee: HOMEAWAY.COM, INC., Austin, TX (US)

( * ) Notice: Subject to any disclaimer, the term of this patent is extended or adjusted under 35 U.S.C. 154(b) by 116 days.

(21) Appl. No.: 15/161,190

(22) Filed: May 20, 2016

(65) Prior Publication Data

US 2017/0337648 A1 Nov. 23, 2017

(51) Int. Cl.

*G06Q 50/16* (2012.01)
*G06Q 30/06* (2012.01)
*G06F 16/951* (2019.01)
*G06F 16/9538* (2019.01)
*G06F 16/953* (2019.01)

(52) U.S. Cl.

CPC ........... *G06Q 50/16* (2013.01); *G06F 16/951* (2019.01); *G06F 16/953* (2019.01); *G06F 16/9538* (2019.01); *G06Q 30/0645* (2013.01)

(58) Field of Classification Search

CPC ..................... G06F 14/30864; G16F 14/30277

See application file for complete search history.

(56) References Cited

U.S. PATENT DOCUMENTS 7,089,266 B2 * 8/2006 Stolte .................. G06F 3/04847 707/769
7,295,719 B2 * 11/2007 Robertson .............. G06F 16/58 382/305
7,493,315 B2 * 2/2009 Holbrook ........... G06Q 30/0603
7,519,238 B2 * 4/2009 Robertson .............. G06F 16/58 382/305
7,644,373 B2 * 1/2010 Jing ...................... G06F 3/0482 715/838
7,698,331 B2 * 4/2010 Carson, Jr. ............ G06F 16/951 707/728

(Continued)

OTHER PUBLICATIONS

Yushi Jing et. al.; Google Image Swirl A Large-Scale Content-Based Image Visualization System; WWW 2012—Poster Presentation Apr. 16-20, 2012, Lyon, France; 2 pages.*

*Primary Examiner* — Scott T Baderman
*Assistant Examiner* — Benjamin Smith
(74) *Attorney, Agent, or Firm* — Knobbe, Martens, Olson & Bear, LLP

(57) ABSTRACT

Various embodiments relate generally to a system, a device and a method for providing a panel-based search interface as a function of incremental entry of user data, such as text representing a destination. Data representing user input is received at a search interface presented by a listing management system. One or more panel objects are determined based on the user input. Data representing one or more interests associated with the user input is retrieved. The one or more panel objects and the data representing the one or more interests are rendered within the search interface. Responsive to the received user input, the search interface comprising the rendered one or more panel objects and the data representing the one or more interests is provided.

15 Claims, 11 Drawing Sheets

(56) References Cited

U.S. PATENT DOCUMENTS 7,818,176 B2 * 10/2010 Freeman ............ G06Q 30/0241 704/270
8,145,489 B2 * 3/2012 Freeman ............ G06Q 30/0241 704/257
8,200,617 B2 * 6/2012 Spivack .............. G06F 17/2785 707/602
8,352,465 B1 * 1/2013 Jing ........................ G06F 16/54 707/723
8,452,794 B2 * 5/2013 Yang ..................... G06F 16/532 707/767
8,527,274 B2 * 9/2013 Freeman ............ G06Q 30/0241 704/257
8,589,410 B2 * 11/2013 Sud ..................... G06F 16/5838 707/748
8,676,803 B1 * 3/2014 Leung ................. G06F 16/5866 707/737
8,701,027 B2 * 4/2014 van Dantzich ....... G06F 3/0482 715/768
8,799,817 B2 * 8/2014 Koradi .................. G06F 3/0482 715/830
8,843,478 B1 * 9/2014 Jing ........................ G06F 16/54 707/723
8,886,536 B2 * 11/2014 Freeman ............ G06Q 30/0241 704/257
8,887,037 B1 * 11/2014 Cook .................. G06F 16/9577 715/208
8,996,527 B1 * 3/2015 Leung ................. G06F 16/5866 707/737
9,025,888 B1 * 5/2015 Jing ...................... G06F 16/444 382/225
9,070,175 B2 * 6/2015 Hurst ..................... G06Q 50/12
9,116,921 B2 * 8/2015 Jing ........................ G06F 16/54
9,152,734 B2 * 10/2015 Rinearson .............. G06Q 30/02
9,342,219 B2 * 5/2016 Greifeneder .......... G06F 3/0484
9,411,891 B2 * 8/2016 Li .......................... G06Q 50/01
9,507,803 B2 * 11/2016 Sud ..................... G06F 16/5838
9,529,800 B2 * 12/2016 Hochmuth ............. G09G 5/377
9,654,654 B1 * 5/2017 Jing ...................... G06F 16/444
9,696,872 B2 * 7/2017 Claycomb ............. G06F 3/0482
9,842,167 B2 * 12/2017 Cardell ................. G06F 16/951
9,977,827 B2 * 5/2018 Stading ................. G06F 16/338
2002/0054117 A1 * 5/2002 van Dantzich ....... G06F 3/0482 715/766
2004/0243593 A1 * 12/2004 Stolte .................... G06F 17/246
2005/0203918 A1 * 9/2005 Holbrook ............... G06Q 40/04
2005/0222900 A1 * 10/2005 Fuloria .................. G06Q 30/02 705/14.54
2006/0161534 A1 * 7/2006 Carson, Jr. ............ G06F 16/951
2006/0195462 A1 * 8/2006 Rogers .................... G06F 21/10
2007/0011146 A1 * 1/2007 Holbrook ........... G06Q 30/0603
2007/0038950 A1 * 2/2007 Taniguchi .............. G01C 21/26 715/768
2007/0050412 A1 * 3/2007 Robertson ............... G06F 16/58
2007/0174790 A1 * 7/2007 Jing ...................... G06F 3/0482 715/838
2007/0192168 A1 * 8/2007 Van Luchene ....... G06Q 10/047 705/14.54
2007/0226640 A1 * 9/2007 Holbrook .............. G06F 16/951 715/765
2008/0019614 A1 * 1/2008 Robertson ............... G06F 16/58 382/305
2008/0104032 A1 * 5/2008 Sarkar ................... G06F 16/958
2008/0189110 A1 * 8/2008 Freeman ............ G06Q 30/0241 704/251
2008/0243784 A1 * 10/2008 Stading ................. G06F 16/338
2009/0100365 A1 * 4/2009 Sjolin .................. G06F 3/0481 715/765
2009/0187864 A1 * 7/2009 Bedell ................. G06F 3/04817 715/854
2010/0049629 A1 * 2/2010 Rathod ............. G06Q 30/0601 705/26.1
2010/0100457 A1 * 4/2010 Rathod ............. G06Q 30/0601 705/26.1
2010/0205202 A1 * 8/2010 Yang ..................... G06F 16/532 707/767
2010/0268720 A1 * 10/2010 Spivack .............. G06F 17/2785 707/756
2010/0299142 A1 * 11/2010 Freeman ............ G06Q 30/0241 704/9
2011/0029384 A1 * 2/2011 Wei ....................... G06F 3/0481 705/14.53
2011/0035406 A1 * 2/2011 Petrou .................. G06F 16/434 707/769
2011/0055203 A1 * 3/2011 Gutt .................... G06F 3/04815 707/722
2011/0270672 A1 * 11/2011 Hillard ................... G06Q 30/02 705/14.42
2011/0296351 A1 * 12/2011 Ewing, Jr. ............ G06F 3/0346 715/841
2012/0005209 A1 * 1/2012 Rinearson .............. G06Q 30/02 707/737
2012/0054687 A1 * 3/2012 Kawabata ............ G06F 16/951 715/836
2012/0109986 A1 * 5/2012 Palermiti, II ......... G06F 3/0482 707/754
2012/0134590 A1 * 5/2012 Petrou ................ G06K 9/00483 382/182
2012/0150636 A1 * 6/2012 Freeman ............ G06Q 30/0241 705/14.49
2012/0185761 A1 * 7/2012 Adepalli ............. G06F 3/04883 715/227
2012/0297327 A1 * 11/2012 Chow .................. G09B 29/007 715/765
2012/0304123 A1 * 11/2012 Koradi .................. G06F 3/0482 715/825
2012/0311431 A1 * 12/2012 Breaker ................. G06Q 30/06 715/234
2013/0097181 A1 * 4/2013 Sud ..................... G06F 16/5838 707/748
2013/0219314 A1 * 8/2013 Greifeneder .......... G06F 3/0484 715/767
2013/0268349 A1 * 10/2013 Amirbekyan ...... G06Q 30/0244 705/14.43
2014/0012577 A1 * 1/2014 Freeman ............ G06Q 30/0241 704/249
2014/0074852 A1 * 3/2014 Sud ..................... G06F 16/5838 707/741
2014/0208262 A1 * 7/2014 Huang .................. G06F 3/0481 715/800
2014/0258285 A1 * 9/2014 Lavine .................... G06F 16/29 707/728
2014/0279087 A1 * 9/2014 Hurst ..................... G06Q 50/12 705/15
2014/0310255 A1 * 10/2014 Cardell ................. G06F 16/951 707/706
2014/0351730 A1 * 11/2014 Claycomb ............. G06F 3/0482 715/769
2014/0351731 A1 * 11/2014 Claycomb ............. G06F 3/0482 715/769
2014/0358880 A1 * 12/2014 Li .......................... G06Q 50/01
2014/0380246 A1 * 12/2014 Blundell ............... G06F 16/957 715/854
2015/0066594 A1 * 3/2015 Li ...................... G06Q 30/0202 705/7.31
2015/0095850 A1 * 4/2015 Palermiti, II ......... G06F 3/0482 715/810
2015/0120717 A1 * 4/2015 Kim ...................... G06F 16/335 707/727
2015/0169571 A1 * 6/2015 Farago .................. G06F 16/248 707/723
2015/0234818 A1 * 8/2015 Hochmuth ............. G09G 5/377 707/752
2015/0254277 A1 * 9/2015 Campbell ............... G06F 16/29 715/771
2015/0302488 A1 * 10/2015 Wilson ................... G06Q 30/02 705/306

(56) References Cited

U.S. PATENT DOCUMENTS

2015/0355817 A1* 12/2015 Dai ........................ G06F 16/954
715/763
2015/0370833 A1* 12/2015 Fey ........................ G06F 16/532
707/767
2016/0026697 A1* 1/2016 Rinearson .............. G06Q 30/02
707/722
2016/0078132 A1* 3/2016 Cardell ................. G06F 16/951
707/706
2016/0179358 A1* 6/2016 Ohki ..................... G06F 3/0482
715/800
2016/0314216 A1* 10/2016 Li .......................... G06Q 50/01
2017/0038960 A1* 2/2017 Piroddi ................. G06F 3/0486
2017/0235456 A1* 8/2017 Maita ..................... G06Q 30/02
715/234
2017/0249062 A1* 8/2017 Mariner .................. G06T 11/60
2018/0075415 A1* 3/2018 Ray ......................... G06F 16/29

* cited by examiner

HIERARCHICAL PANEL PRESENTATION RESPONSIVE TO INCREMENTAL SEARCH INTERFACE

FIELD

Various embodiments relate generally to electrical and electronic hardware, computer software, wired and wireless network communications, and distributed software applications for content presentation. More specifically, a system and a method provide for providing a panel-based incremental search interface.

BACKGROUND

Conventional techniques for content presentation have evolved away from mere pen-and-paper implementations as the complexity increases have increasingly relied on technological solutions. With the advent of computing devices, massive amounts of data representing property listings are stored in multiple and disparate systems. Enabling searching users to access property listings remains a challenge.

For example, conventional approaches may require a searching user to input several keywords in a textual search interface. The searching user may not enter the optimal keywords and may not be presented with optimal property listings as a result. Additionally, the searching user may not be aware of points of interest that are popular among other users.

While conventional approaches are functional, the usual structures and/or functionalities for searching property listings are not suited to the increasing technological demands required to analyze the data. In some cases, traditional computing technologies are typically suboptimal in that user experience and information availability for rental properties listings may be impaired or otherwise degraded due to conventional search applications that require users to transition to more web pages than may be necessary. For example, a user may experience numerous web pages and corresponding page loads, each of which consumes a certain amount of time and computational resources. Further, sequential page loads and/or web page replacement transitions may disrupt or degrade a session as information on prior web pages of rental listings are obscured by subsequent transition to other web pages and/or page loads.

Thus, what is needed is a solution for effectively searching property listings without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Figure 1A:
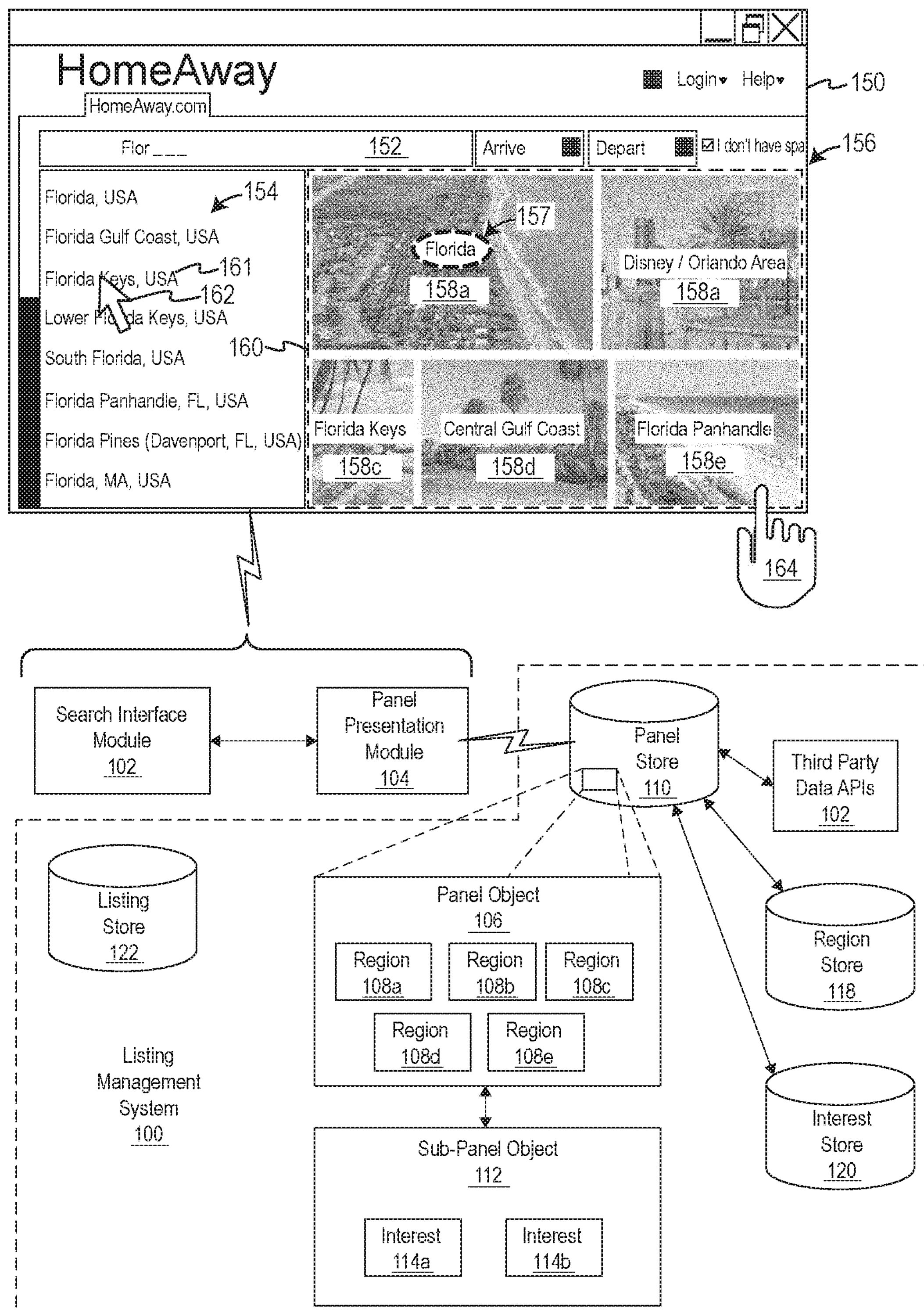
FIG. 1A is a high-level block diagram depicting implementation of an incremental panel-based search interface in association with a listing management system, according to an embodiment.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Traveling around the world has never been easier in the Internet age. People wishing to travel less expensively, with family, or luxuriously may search various websites for the best deals and/or best amenities for hotels, vacation homes, and short-term rentals. With the advent of on-demand housing software applications, owners and travellers may interact with property listings on various websites, mobile applications, and application services. For example, a homeowner may list their property on an on-demand housing software application with an availability, rental cost, description of the property, and photos with accompanying captions describing the property. Travellers may browse through the various property listings, bookmark or indicate interest in a particular listing, and submit reviews for property listings via the on-demand housing software application provided through a mobile application operating on a mobile device or a website running on a web browser accessed through the Internet.

Users may also view content provided by administrators of the on-demand housing software application through various methods, such as viewing web pages of hosted websites by the on-demand housing software application, downloading application onto mobile devices provided by the on-demand housing software application, and viewing content pushed to the applications, for example. The on-demand housing software application may further deliver content on-demand, such as photos of property listings, streamed in high-resolution and/or high-definition, for example. Content files, such as photos, video, audio, and so forth, may be stored on a secured system, but exposed to Internet users, for example. Data representing a content file may be described as a "content item," according to some embodiments.

Listings may be associated with several components that are aggregated and stored in separate data sources, such as price data arrangements, description data arrangements, amenities data arrangements, points of interest data arrangements, region data arrangements, among other data arrangements, files, graphs, etc. For example, a database may store listings associated with a certain geographic region, such as Florida. A separate data file stored on a networked source may include recently updated study of multiple regions that have similar price points. A further data source may include recently received listings from users of a listing management system. In one embodiment, an application programming interface (API) may be used to access third-party data sources, such as data representing maps, restaurant guides, nearby attractions, etc. from originators (e.g., networked computing systems) of such data. Enabling searching users to easily browse through such information may be a daunting task. In one embodiment, a search interface may implement incremental search functionality (e.g., type ahead functionality) to identify search result including panel objects to surface nodes that may be of interest to a user searching for rental properties based on entered user input data.

FIG. 1A is a high-level block diagram depicting a process of providing an incremental panel-based search interface in a listing management system 100, according to an embodiment. The listing management system 100 may include a search interface module 102, for example, that may be used to provide a search interface for facilitating panel-based searching by users of the listing management system 100 to browse presentations of data representing property listings. The search interface module 102 may be configured to request data representing property listings from a listing store 122 based on entered user input. In one embodiment, user input data may be provided to a panel presentation module 104 to request panel objects for inclusion in the search interface. For example, user input representing a search query (e.g., entered via search field 152 of user interface 150) may be related to a subset of text or characters representing a region, such as "Florida" 158*a*, which, in turn, may be associated with other sub-regions or related co-regions, such as "Disney/Orlando" 158*b*, "Florida Keys" 158*c*, "Central Gulf Coast" 158*d*, and "Florida Panhandle" 158*e*. Thus, "Disney/Orlando" 158*b*, "Florida Keys" 158*c*, "Central Gulf Coast" 158*d*, and "Florida Panhandle" 158 may be represented as data components at a lower hierarchical level than data components associated with higher hierarchical level "Florida 158*a*"

FIG. 1A and the other figures use like reference numerals to identify like elements. For example, a letter after a reference numeral, such as "108*a*," indicates that the text refers specifically to the element having that particular reference numeral. A reference numeral in the text without a following letter, such as "108," refers to one or more of the elements in the figures bearing that reference numeral (e.g., "108" in the text refers to reference numerals "108*a*," "108*b*," "108*c*," "108*d*," and/or "108*e*" in the figures). While five region components 108 are illustrated in a panel object 106 in FIG. 1A to simplify and clarify the description, any number of region components may be implemented.

A panel presentation module 104 may be configured to generate and/or retrieve data representing one or more panel objects 106 from a panel store 110, for example, based on the user input provided by the search interface module 102. Each panel object 106 may correspond to a topic and may include several data components, including multiple region components 108, in an embodiment. A region component 108 may be linked, or related, to other data components of the panel object 106. For example, a user may enter characters or text representing "Florida" into a portion of a search interface, such as a text box or search field 152. The incremental search functionality may present matching and/or relevant panel objects 106 based on the user input. In some embodiments, the incremental search functionality may be implemented as typeahead searching functionality whereby related text results 154 (e.g., autocomplete data) may be presented as predicted information for which a user may desire to obtain search results. For example, panel objects 106 having a data component, such as a region data component 108 associated with "Florida," may be retrieved from the panel store 110 based on the user input. One or more sub-panel objects 112, which are associated with a further lower hierarchical level, may be associated with each panel object 106. For example, a sub-panel object 112 associated with a panel object 106 for "Florida Keys" may include two interests 114, one interest 114*a* associated with "Scuba" and another interest 114*b* associated with "Condo." Interests 114 may be associated with a sub-panel object 112 by a separate process. Interests 114 may be stored in an interest store 120 and associated with listings stored in a listing store 122. Because one or more sub-panel objects 112 may be associated with a panel object 106, a user may be presented with a typeahead results user interface that enables the user to quickly identify a more narrowed search (e.g., without transitioning to a next web page or without executing a page load).

For example, after data representing user input "Florida," a user may be presented with five panel objects 106 having regions 108 associated with a higher hierarchical level associated with term "Florida." The panel objects 106 may be each associated with one or more sub-panel objects 112. The user, upon being presented with the panel objects 106 by the panel presentation module 104, may hover a cursor 162 or other pointing user interface device 164 over a portion of the panel objects 106, such as "Florida Keys" 158*c*. Upon that user action with the user interface, the one or more sub-panel objects 112 associated with the panel object 106 over which the pointing device is hovering may render the associated sub-panel object(s) 112 as selectable links, such as "Scuba" and "Condo," according to some embodiments. The user may then select one of the links for "Scuba" or "Condo" that returns search results for listings that include the selected term within the "Florida Keys" region 158*c*. Listings may be retrieved by the search interface module 102 from the listing store 122 using the search terms obtained from the user's actions (hovering over/ selecting the panel object 106 for "Florida Keys" and selecting a link for "Scuba"), in one embodiment.

In some embodiments, third party data application programming interfaces (APIs) 116 may be used to generate one or more panel objects 106 and/or one or more sub-panel objects 112 based on other content (e.g., content items including data or information other than that relating to rental properties). For example, a sponsored panel object 106 may be generated by a third party data source, such as an advertising network. A third party data API 116 may be used to retrieve and store sponsored panel objects 106 in a panel store 110. In one embodiment, a sponsored panel object 106 may be presented dynamically by a panel presentation module 104 using one or more third party data APIs 116. In another embodiment, a third party data API 116 may be used to present relevant interests 114 associated with a region 108 presented in a panel object 106. For example, an interest 114 in "Golf" may use a third party data API 116 to retrieve search results for nearby golf courses for presentation with listings located near the golf courses. In yet another embodiment, a third party data API 116 may be used to render other types of panels within the search interface. For example, a map of Florida may be rendered using a third party data source through one or more third party data APIs 116. As another example, a panel object 106 may be rendered that lists connections and/or friends on a social networking website, such as FACEBOOK or TWITTER, that have performed similar searches or have stayed at properties associated with listings presented by the listing management system 100. This information may be presented in a panel object 106 through one or more third party data APIs 116, in an embodiment. Example inputs and outputs of the system 100 are described throughout as inputs and outputs of the various novel functions described herein.

In view of the foregoing, a search interface module 102 is configured to incrementally receive characters in a text search, and to generate data signals including one or more characters that are received by panel presentation module 104. As one or more additional text characters are entered into field 152, panel presentation module 104 is configured to generate panel objects 106 and portions thereof that relate to the combination of characters in field 152. For example, if a subset of characters in field 152 are "FLOR" then, panel presentation module 104 may identify panel objects 106 related to either a first region (e.g., geographic region) describing "Flor-A-Mar, New Port Richey, Florida" or a second region describing "Florida" at-large. According to some embodiments, the constituent portions 158 of user interface (e.g., regions 108) are selected as a function of, for example, on predicted next characters that may likely follow the initial entry of "FLOR." As more searches relate to "Florida" at-large, then panel presentation module 104 may be configured to generate data representing panel portions "Florida 158*a*", Disney/Orlando" 158*b*, "Florida Keys" 158*c*, "Central Gulf Coast" 158*d*, and "Florida Panhandle" 158 to form panel object 156, rather than panel portions relating to Flor-A-Mar. In various implementations, panel presentation module 104 is configured to identify an order of panel portions to be presented in user interface 150, which may be associated with a user device (e.g., a client, such as a mobile phone). According to various embodiments, panel presentation module 104 may be configured to identify the ordered set of panel portions (e.g., regions 108) and to resize each of the panel portions to present an optimal number of panel portions to fit within user interface portion perimeter 160. In one example, panel presentation module 104 is configured to size a width of a panel portion based on a number of characters 157 identifying a panel portion and/or size of an image, the image and/or the number of characters 157 constituting one or more content items.

Note further, that a cursor 162 hovering over a selection 161 (or any other interaction, such as a finger 164 on a touch-sensitive display) may cause panel object 156 to regenerate to present panel portions that relate, as lower hierarchical data components, to specific rental listings or events associated with "Florida Keys," which is associated with selection 161. As such, multiple hierarchical levels or layers may be presented contemporaneously (e.g., without additional page loads and/or without web page transitions). In some embodiments, panel presentation module 104 may be configured to implement machine learning or any other process for correlating search patterns to predict which panel portions ought to be presented for each unique combination of text characters entered into field 152.

According to some embodiments, search interface module 102 and panel presentation module 104 may be implemented in hardware or software, or a combination thereof. Further one or more of search interface module 102 and panel presentation module 104 may be implemented as a portion of listing management system 100, a client or user device (e.g., not shown), such as a mobile computing device or phone, or another computational resource. According to some embodiments, listing store 122, panel store 110, region store 118, and interest store 120 may be implemented as databases or other memory storage devices configured to store listing data, panel object data, region-related data, and user interest data, respectively.

Figure 1B:
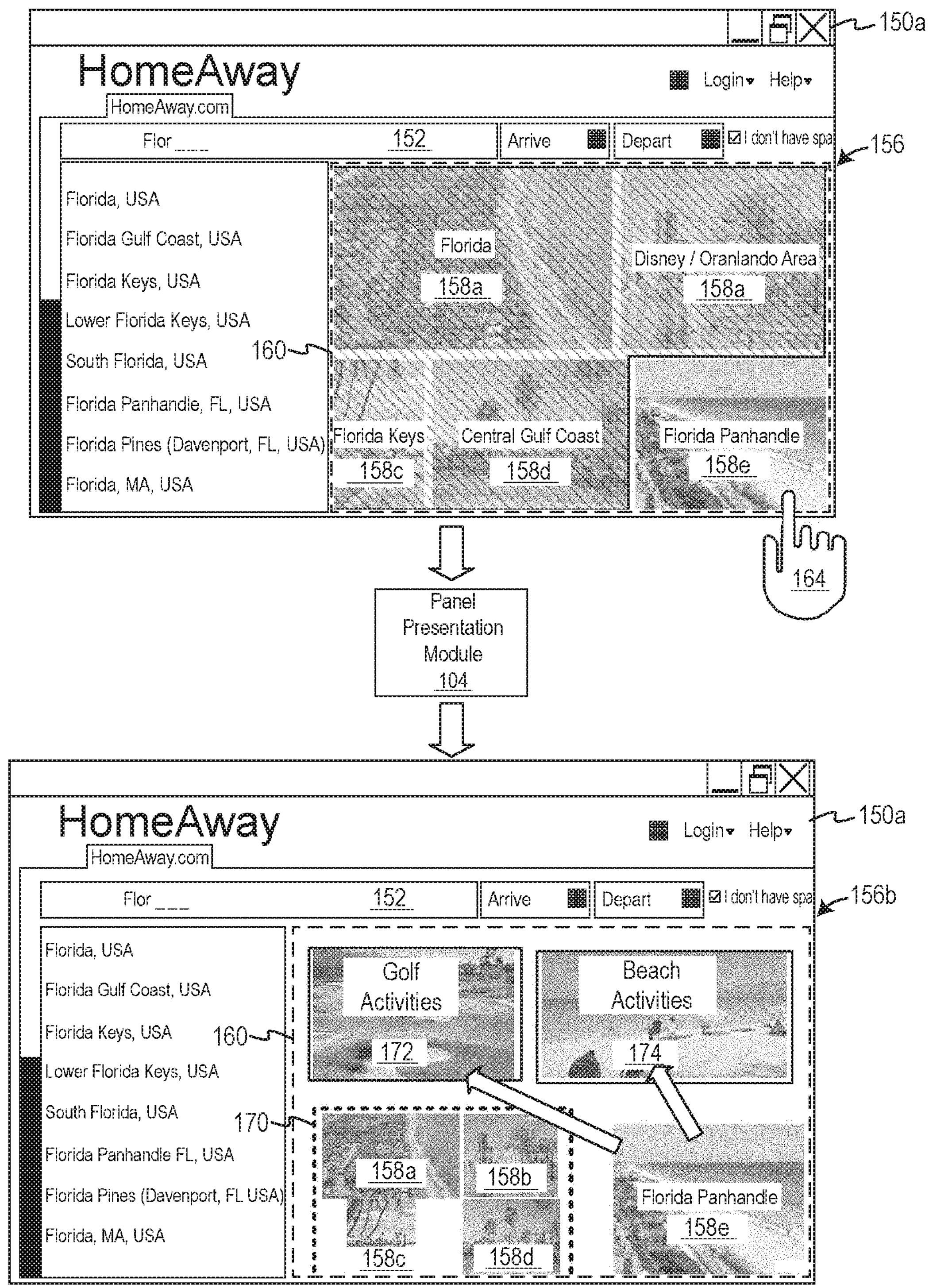
FIG. 1B is a diagram depicting operation of an example of a panel presentation module, according to some embodiments.

FIG. 1B is a diagram depicting operation of an example of a panel presentation module, according to some embodiments. In the example shown, a user interaction 164 selects a region 158*e* of panel object 156*a* presented in user interface 150*a*. The cross-hatching over panel portions 158*a*, 158*b*, 158*c*, and 158*d* indicates that content items for those portions are to be reduced or suppressed to enable a next lower hierarchical set of panel portions 172 and 174 to be displayed. Further to this example, panel presentation module 104 may be configured to reduce an area of each of panel portions 158*a*, 158*b*, 158*c*, and 158*d* so that in the aggregate they are disposed in perimeter 170 of panel object 156*b*. Panel presentation module 104 may be further configured to generate panel portions "Golf Activities" 172 and "Beach Activities" 174, both of which may include imagery as content items and are sub-regions (e.g., sub-panel objects 112 of FIG. 1A). Accordingly, multiple hierarchical levels of listing—related data may be contemporaneously viewable and selectable, thereby facilitating unimpeded (or nearly unimpeded) rental listing searching that enables less search time than otherwise might be the case.

According to some embodiments, panel portions "Golf Activities" 172 and "Beach Activities" 174 each may include links (e.g., hypertext links) to further lower hierarchical levels. As such, selection of such a link may cause generation of a next set of hierarchical levels, similar to the generations of panel portions "Golf Activities" 172 and "Beach Activities" 174. For example, selection of "Golf Activities" 172 may cause "Beach Activities" 174 to be removed or to be reduced in size so as to provide surface area in which to display one or more sub-sub-regions (e.g., as sub-sub-panel objects).

System Architecture

Figure 2:
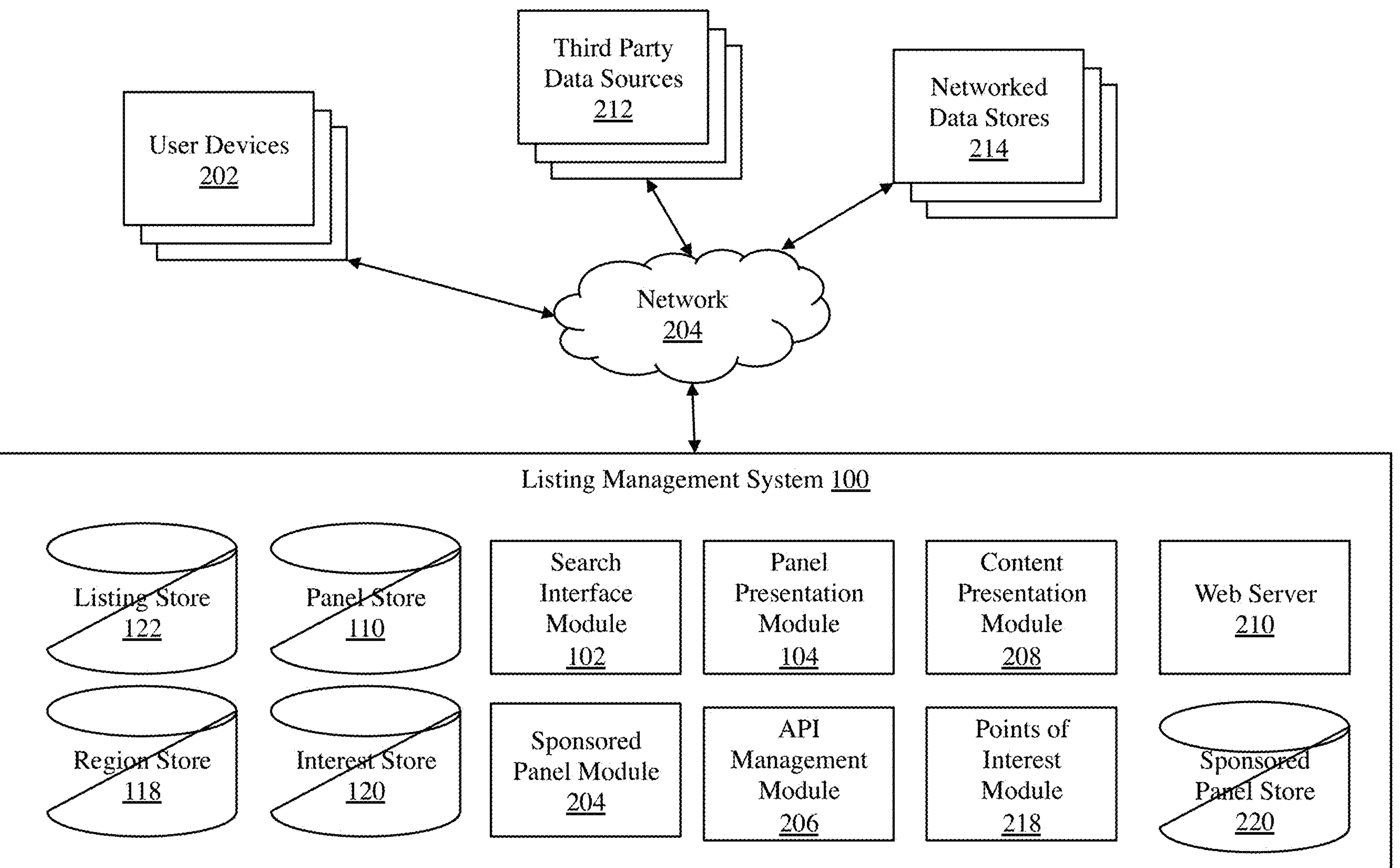
FIG. 2 is a network diagram of a system for providing an incremental panel-based search interface in a listing management system, showing a block diagram of the listing management system, according to an embodiment.

FIG. 2 is a network diagram of a system for providing an incremental panel-based search interface in a listing management system, showing a block diagram of the listing management system, according to an embodiment. The system environment includes one or more user devices 202, third party data sources 212, networked data stores 214, the listing management system 100, and a network 204. In alternative configurations, different and/or additional modules can be included in the system.

The user devices 202 may include one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, wearable device, etc. The user device 202 is configured to communicate via network 204. The user device 202 can execute an application, for example, a browser application that allows a user of the user device 202 to interact with the listing management system 100. In another embodiment, the user device 202 interacts with the listing management system 100 through an application programming interface (API) that runs on the native operating system of the user device 202, such as iOS and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML), In addition, all or some of links can be encrypted using conventional encryption technologies such as secure sockets layer (SSL), transport layer security (TLS), and Internet Protocol security (IPsec).

FIG. 2 contains a block diagram of the listing management 100. The listing management system 100 includes a listing store 122, a region store 118, a panel store 110, an interest store 120, a sponsored panel store 220, a search interface module 102, a panel presentation module 104, a sponsored panel module 204, a points of interest module 218, a web server 210, an API management module 206, and a content presentation module 208. In other embodiments, the listing management system 100 may include additional, fewer, or different modules for various applications. Conventional components such as network interfaces, security functions, load balancers, failover servers, management and network operations consoles, and the like are not shown so as to not obscure the details of the system.

The web server 210 links the listing management system 100 via the network 204 to one or more user devices 202; the web server 210 serves web pages, as well as other web-related content, such as Java, Flash, XML, and so forth. The web server 210 may provide the functionality of receiving and routing messages between the listing management system 100 and the user devices 202, for example, instant messages, queued messages (e.g., email), text and SMS (short message service) messages, or messages sent using any other suitable messaging technique. The user can send a request to the web server 210 to upload information, for example, content that is stored in a listing store 122. Additionally, the web server 210 may provide API functionality to send data directly to native user device operating systems, such as iOS, ANDROID, webOS, and RIM.

A listing store 122 may store content uploaded by users of the listing management system 100. Content for a property listing may include a title of a property, text describing the property listing, photos and/or video of the property, reviews provided by travelers staying at the property listing, amenities available at the property, contact information of the owner or property manager, and so forth. Content for a traveler may include profile information about the traveler, in one embodiment. A region store 118 may include data items about regions where properties are located, such as cities, neighborhoods, metropolitan areas, states, countries, and other defined regions. Multiple regions may be associated with a listing. For example, a listing in San Francisco, Calif. may be associated with a Twin Peaks neighborhood region, a central region of San Francisco, Calif., a "popular" region for listings, a San Francisco region, a San Francisco Bay Area region, a Northern California region, a California region, a West Coast region, a USA region, and so forth. In one embodiment, a region may be defined by administrators of a listing management system 100. In this way, a region may be curated to include links and relevant filters. For example, a "wine country region" may include Napa, Sonoma, and Mendocino counties of Northern California. The region store 118 may be organized by region, in one embodiment, where each region is uniquely identified. Listings may be identified by a unique identifier and associated with a region in the region store 118.

A panel store 110 may store panel objects that are generated by a panel presentation module 104. A panel object may be generated using an image file with selectable links to associated sub-panel objects. In one embodiment, sub-panel objects may include interests stored in an interest store 120. For example, interests may include points of interest that are located near a listing, such as golf courses, amusement parks, beaches, skiing, and so forth. A listing stored in a listing store 122 may include interests uniquely identified and stored as objects in the interest store 120. In one embodiment, a points of interest module 218 may identify listings that have not been associated with an interest, such as "Golf," but are associated with properties that are geographically located near golf courses, for example. Other interests, such as landmarks, beaches, parks, and the like may be associated with listings in a listing store 122 by the points of interest module 218.

In one embodiment, a sub-panel object for "Beach" may be associated with a panel object based on the number of listings associated with the panel object being associated with the "Beach" interest, the actions of other users in the listing management system 100, and/or a combination of these and other factors. For example, if a number over a predetermined threshold of listings associated with the "Beach" interest have been interacted with (viewed, booked, reviewed, etc.) on the listing management system 100, the "Beach" interest may be surfaced as a sub-panel object for one or more panel objects. In another example, a number over a different threshold of listings having the "Beach" interest may indicate that the interest is popular. As a result, the "Beach" interest may be surfaced as a sub-panel object. In other embodiments, other processes and factors may be used to rank or otherwise identify and select interests for inclusion as a sub-panel object. For example, the time of year, the geographic location of the searching user as obtained by an IP address and/or GPS information, the country of origin associated with the searching user, and/or other profile information about the searching user, including demographic information from a profile as entered by the traveler or obtained from a social networking website using a third party data API, may be used in surfacing and presenting panel objects and/or associated sub-panel objects.

Although one layer of sub-panel objects is described here, multiple layers of sub-panel objects may be implemented in other embodiments. For example, within a "Beach" interest, other related interests may be included as another layer of sub-panel objects. "Surfing," "kayaking," "fishing," and "paragliding" may be other interests related to a "Beach" interest that may be further included as another layer of sub-panel objects. In this way, a searching user may quickly identify property listings that are associated with the tailored interests of the searching user. As another example, a "Condo" interest may include as another layer of sub-panel objects other related interests, such as "laundry," "pool," "kitchen," "fireplace," and other amenities of condos. As a further example, within a "Beach" interest, other popular interests that may be frequently paired with the "Beach" interest, based on prior search results, may be surfaced, such as "Villa," "Condo," and "Surf." In this way, a searching user may be presented with different combinations of interests based on various types of information, including metadata attached to property listings, traveler profile information, geolocation information, and the like.

A points of interest module 218 may be used to curate interests that are associated with regions, in an embodiment. Metadata may be used to identify related interests, in one embodiment. In an embodiment, points of interest module 218 may receive data representing interests associated with regions from a third-party data source 212, a networked data store 214, or other data sources accessible by the listing management system 100.

A search interface module 102 may provide a user with a search interface for interacting with content provided on the listing management system 100. In one embodiment, a search interface provided by the search interface module 102 may include typeahead search results within the search interface as well as rendered panel objects presented by the panel presentation module 104. In one embodiment, the search interface module 102 may render sponsored content, such as a sponsored panel provided by a sponsored panel module 204.

A sponsored panel module 204 may retrieve and/or generate panel objects based on received advertisements and/or sponsored content in the listing management system 100. Sponsored content may be received through a third party data API from a third party data source 212 such as an ad network. In one embodiment, marketers may be provided with an interface through the sponsored panel module 204 to generate sponsored panels through the listing management system 100. A sponsored panel generation interface may be provided to a marketer to enable the marketer to upload images, video, text, and/or other content as well as select interests and regions that may trigger the presentation of the generated sponsored panel object.

A panel presentation module 104 may render one or more panel objects within a search interface provided by a search interface module 102. Each panel object may include an image representative of a region in the listing management system 100. In one embodiment, one or more image files are selected for each region by an administrator of the listing management system 100. Image files may be stored in the listing management system 100 in association with the associated panel objects in the panel store 110. In one embodiment, image files may be retrieved from third party data sources 212 and/or networked data stores 214. The panel presentation module 104 may render the one or more panel objects using one or more declarative user interfaces such that the panel objects are rendered in a specified format according to specified dimensions. The image file used for a region may influence the size of the presented panel object, in one embodiment. In another embodiment, the text associated with the region, such as "Florida Keys" and "Disney/Orlando Area" may also influence the size of the panel object to fit the text in specified format, such as a specified font size, orientation, and arrangement in relation to the other panel objects. The panel presentation module 104 may select one or more sub-panel objects based on the determined size of the associated panel object as presented within the search interface.

In other embodiments, other frameworks may be used to present one or more panel objects within the search interface in response to the user input using typeahead search functionality. For example, five panel objects may be selected for presentation within the search interface. The top five panel objects may be selected based on user popularity and relevance to the inputted text, in one embodiment. In another embodiment, the five panel objects may be selected based on matching and relevant regions compared to the user input. In a further embodiment, past search histories and previously presented search results may be used in selecting the five panel objects. Other frameworks may present more or fewer panel objects. For example, four panel objects may be presented in conjunction with a sponsored panel object. The panel object may be presented as rectangular objects in the search interface in one embodiment, where the dimensions of the rectangular objects are determined based in part on the image files associated with the regions and the length of text associated with the regions. In other embodiments, other shapes and/or content may be used, such as circular images, animated content, audio and/or visual content, and so forth.

An API management module 206 may manage one or more adapters needed for the listing management system 100 to communicate with various third party systems, such as third party data sources 212 and networked data stores 214. Application programming interfaces (APIs), or adapters, may be used to push data to the external tools, websites, and user devices 202. Adapters may also be used to receive data from the external systems. In one embodiment, the API management module 206 manages the amount of connections to the external systems needed to operate efficiently. For example, panel objects may use information retrieved from various third-party data sources 212, such as airfare, transportation, and/or other links applicable to planning a travel getaway. Information gathered at the listing management system 100 may be passed to the third-party data sources 212, such as planned travel dates, regions, and origin location information of the searching user, in one embodiment, to receive relevant information for a third-party panel object.

A content presentation module 208 may provide content on a listing management system 100, including photos, videos, text, and graphics. The content presentation module 208 provides content for display within web browsers. Content may be displayed using various methods, such as JavaScript, Node.js, AJAX, and other methods of providing data via browsers. In one embodiment, the content delivered by the content presentation module 208 may be stored and retrieved from networked data stores 214 through the network 204. Similarly, the content presentation module 208 may provide content via an application natively operating on mobile devices, such as wearable devices and mobile phones. Mobile devices may require APIs to receive data from the listing management system 100. The content presentation module 208 may present data for display through these APIs. In one embodiment, the content delivered by content presentation module 208 may be stored and retrieved from a listing store 122, a panel store 110, a region store 118, an interest store 120, a sponsored panel store 220, third party data sources 212, networked data stores 214, and/or other data sources accessible by the panel presentation module 104 and the search interface module 102.

Figure 3:
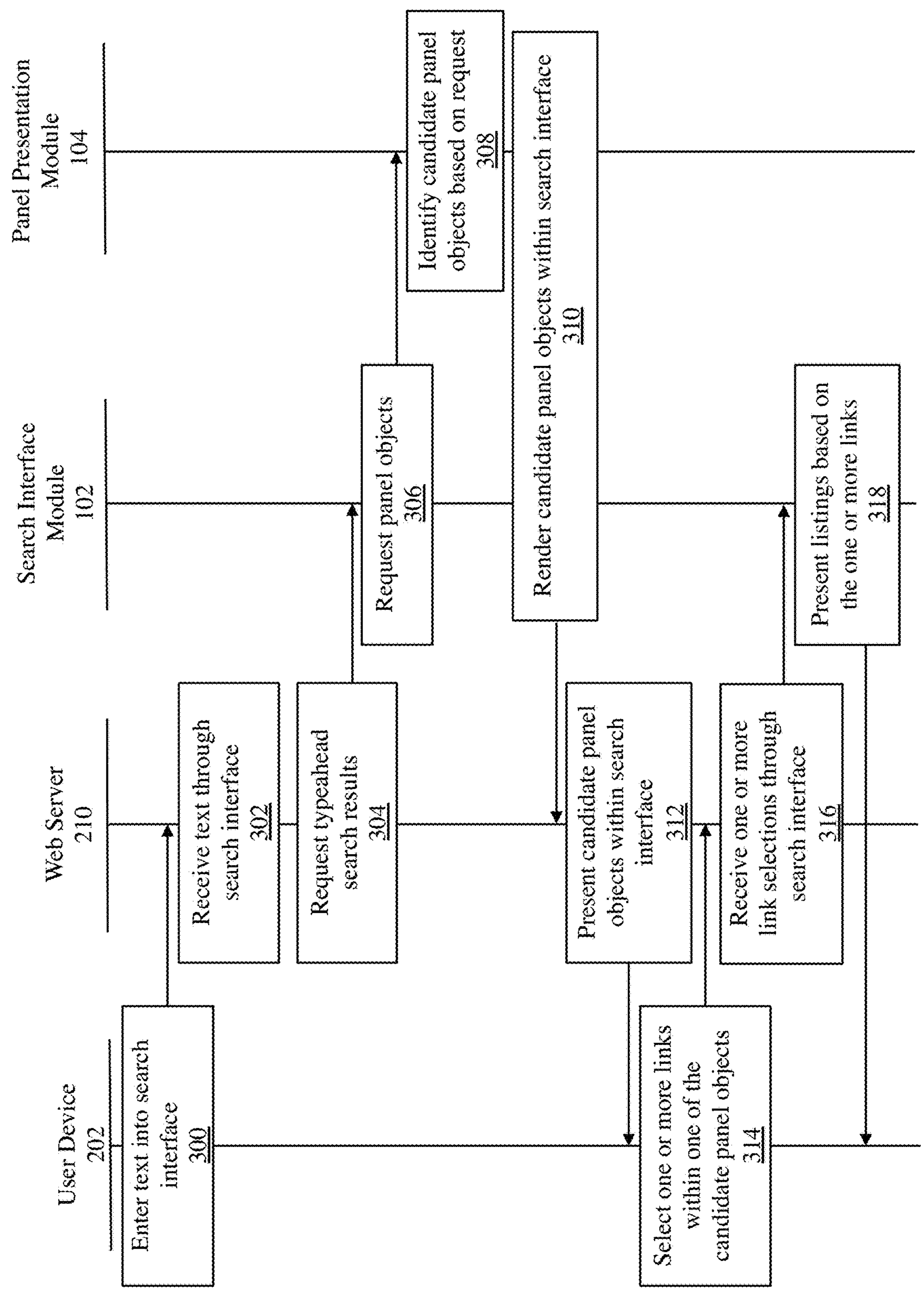
FIG. 3 is an interaction flow diagram illustrating a process for providing an incremental panel-based search interface in a listing management system, according to an embodiment.

FIG. 3 is an interaction flow diagram illustrating a process for providing an incremental panel-based search interface in a listing management system, according to an embodiment. Text may be entered 300 into a search interface at a user device 202. For example, the searching user may input "Florida" or at least the first two characters of that text string. The user input entered 300 into the user device 202 at the search interface is received 302. Other user input may include a selection of a search term 161 using a pointing device, such as cursor 162, in one embodiment. The text is received 302 by the web server 210. In response to the received text, typeahead search results may be requested 304 by the web server 210 to present to the user device 202.

The search interface module 102 receives the request for typeahead search results 304 from the web server 210 and requests 306 panel objects from the panel presentation module 104. Candidate panel objects may be identified 308 by the panel presentation module 104 based on the request. For example, based on the example entered user input of "Florida," one or more panel objects may be retrieved and/or generated as candidate panel objects by the panel presentation module 104. In one embodiment, metadata attached to a received payload is identified. Here, the received payload is the request for typeahead search results 304. Metadata that may be attached to the payload may include regions associated with the entered user input, interest information associated with the regions, traveler profile information, location information based on IP address, geolocation information from a mobile device, and prior search results, in one embodiment.

The search interface module 102 and the panel presentation module 104 may cooperatively render 310 candidate panel objects within the search interface, in one embodiment. For example, the top five panel objects of the candidate panel objects may be selected based on various factors, including popularity among users of the listing management system 100, past search history and/or search results, time of year, time of day, location of the searching user based on IP address of browser and/or geolocation information from a mobile application, social connection information, traveler profile information, and so forth. In one embodiment, the candidate panel objects are rendered using the attached metadata. If there is not attached metadata, no panel objects are rendered, in one embodiment. A tree of metadata may be used, in one embodiment, to surface relevant interests and panel objects based on entered user input. An API service may access a cache that is refreshed asynchronously on a periodic basis (e.g., daily or hourly). The cache may include the tree of metadata that establishes the associations between interests, regions, and additional layers of sub-panels.

In one embodiment, candidate panel objects are ranked according to a priority setting. A priority setting may be generated based on a manual curation by administrators of the listing management system 100 through the attached metadata. In another embodiment, machine learning techniques may be used to determine a priority setting for one or more panel objects. The ranking of panel objects may change the ordering of the panel objects as rendered 310 within the search interface.

The candidate panel objects may be rendered 310 cooperatively based on size of the search interface as presented on the user device 202. In some embodiments, more or fewer candidate panel objects may be rendered 310 based on the size of the search interface on the user device 202. A mobile application operating on a mobile device that presents the search interface to the searching user may render three to four (3-4) panel objects based on the size and orientation of the mobile device, for example. As another example, a browser application operating on a laptop computer that presents the search interface to the searching user may render five (5) panel objects based on the browser application. Two larger panel objects may be arranged above three smaller panel objects in the search interface, in one embodiment.

The data representing the rendered candidate panel objects within the search interface is provided to the web server 210 such that the candidate panel objects may be presented 312 within the search interface on the user device 202. In presenting the candidate panel objects within the search interface on the user device 202, the data representing the candidate panel objects, including associated images, content, selectable links, and program code to render sub-panel objects, is presented 312 within the search interface as part of the typeahead search results, in one embodiment. Other ways of presenting 312 the candidate panel objects may be used, such as pop-up objects, animated panel objects, banner style objects, and so forth.

The searching user may, through the search interface, select 314 one or more links within one of the candidate panel objects. This user selection may include a hovering action by moving a pointer or pointing device or tapping on a touch screen to one of the presented candidate panel objects. This user selection is received 316 by the web server 210 and provided to a search interface module 102. The search interface module 102 then presents 318 listings based on the one or more links. The data representing the listings is presented 318 to the user device 202 based on the selected one or more links. For example, a user may select "Florida Keys" as a presented panel object and then select a "Beach" link associated with the "Beach" interest. As a result, search listings from the region "Florida Keys" that also include a "Beach" interest may be presented 318 to the user device 202 associated with the user.

Figure 4A:
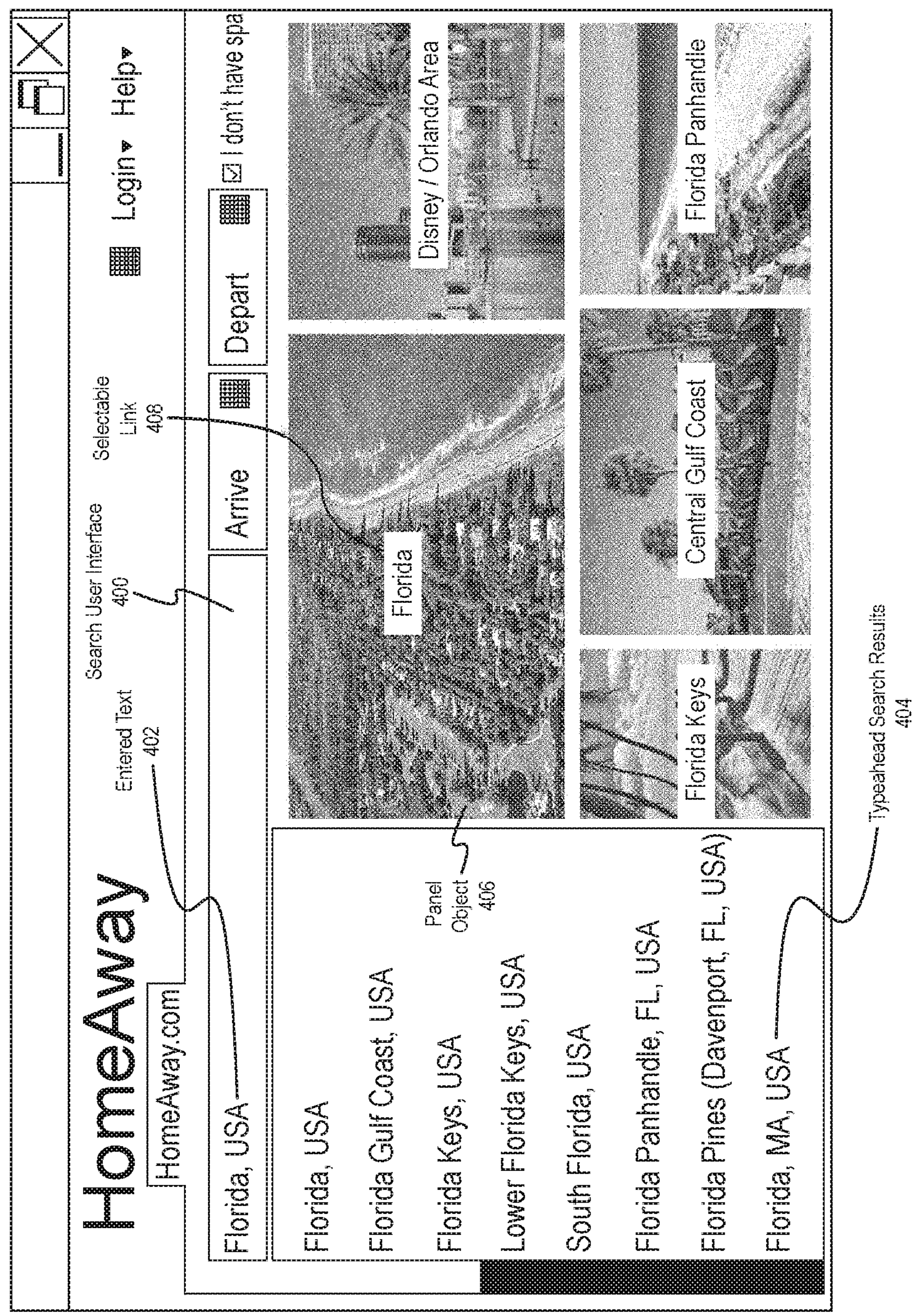
FIGS. 4A-4D are example screenshots of providing an incremental panel-based search interface in a listing management system, according to an embodiment.

FIGS. 4A-4D are example screenshots of providing an incremental panel-based search interface in a listing management system, according to an embodiment. FIG. 4A illustrates a search user interface 400 with entered text 402 comprising "Florida" as well as typeahead search results 404. Typeahead search results 404 may include text that matches the entered text 402. Additionally, five panel objects 406 are rendered within the search user interface 400. As illustrated in the example screenshot of FIG. 4A, panel objects for "Florida," "Disney/Orlando Area," "Florida Keys," "Central Gulf Coast," and "Florida Panhandle" are rendered as selectable links 408 within the search user interface.

Figure 4B:
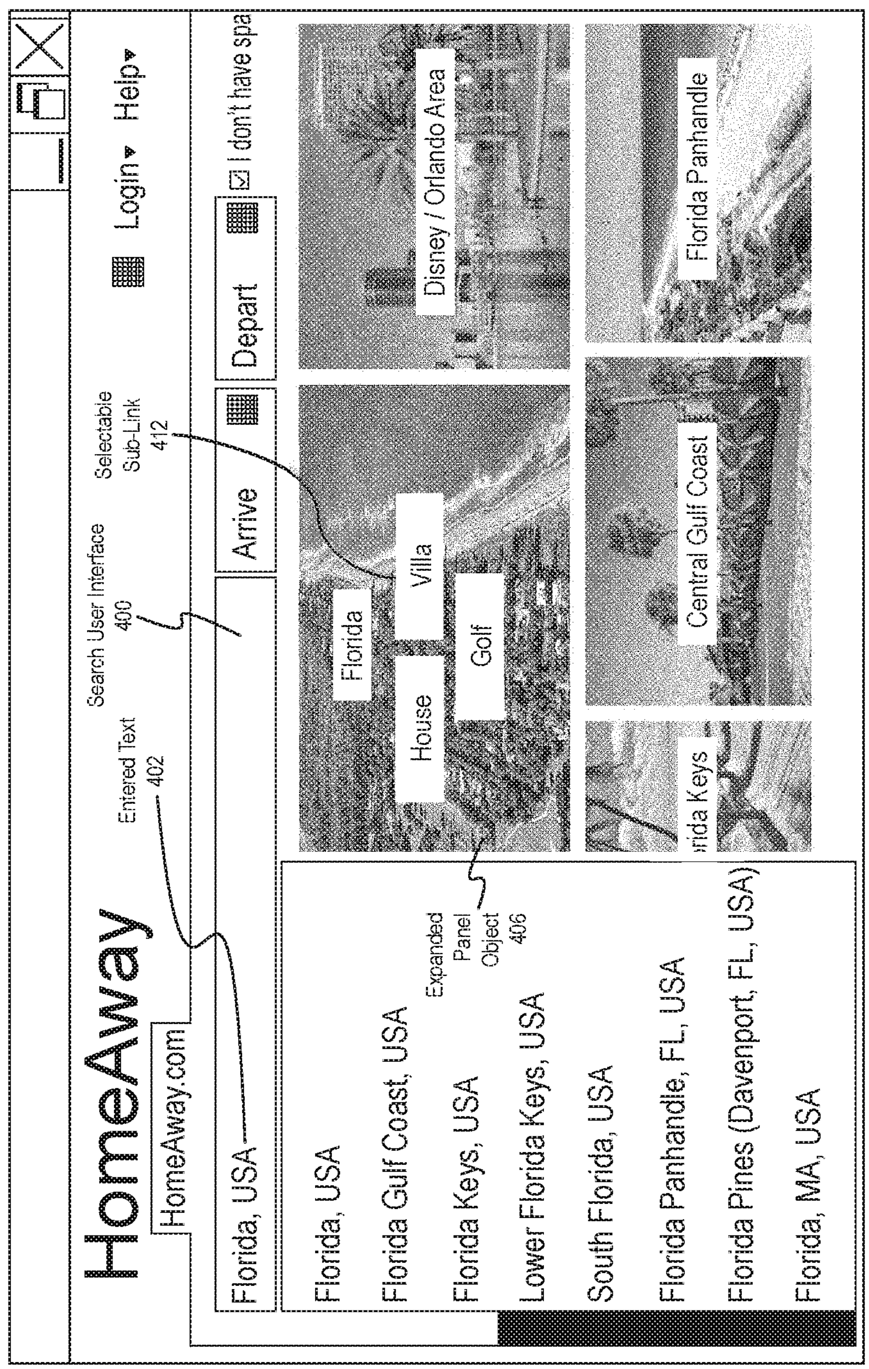

FIG. 4B illustrates another example screenshot of providing an incremental panel-based search interface in a listing management system, according to an embodiment. Here, the search user interface 400 includes an expanded panel object 410 where the "Florida" panel object now includes three selectable sub-links 412, "House," "Villa," and "Golf." "House" and "Villa" are types of properties that are included in the "Florida" region and "Golf" is a type of amenity that may be located near properties in the "Florida" region. Each of the selectable sub-links 412 may be stored as interests in the listing management system 100. The selectable sub-links 412 may be surfaced and/or identified based on the processes and algorithms described above, such as user popularity, time of year, time of day, location of searching user, sponsored content, and so forth.

Figure 4C:
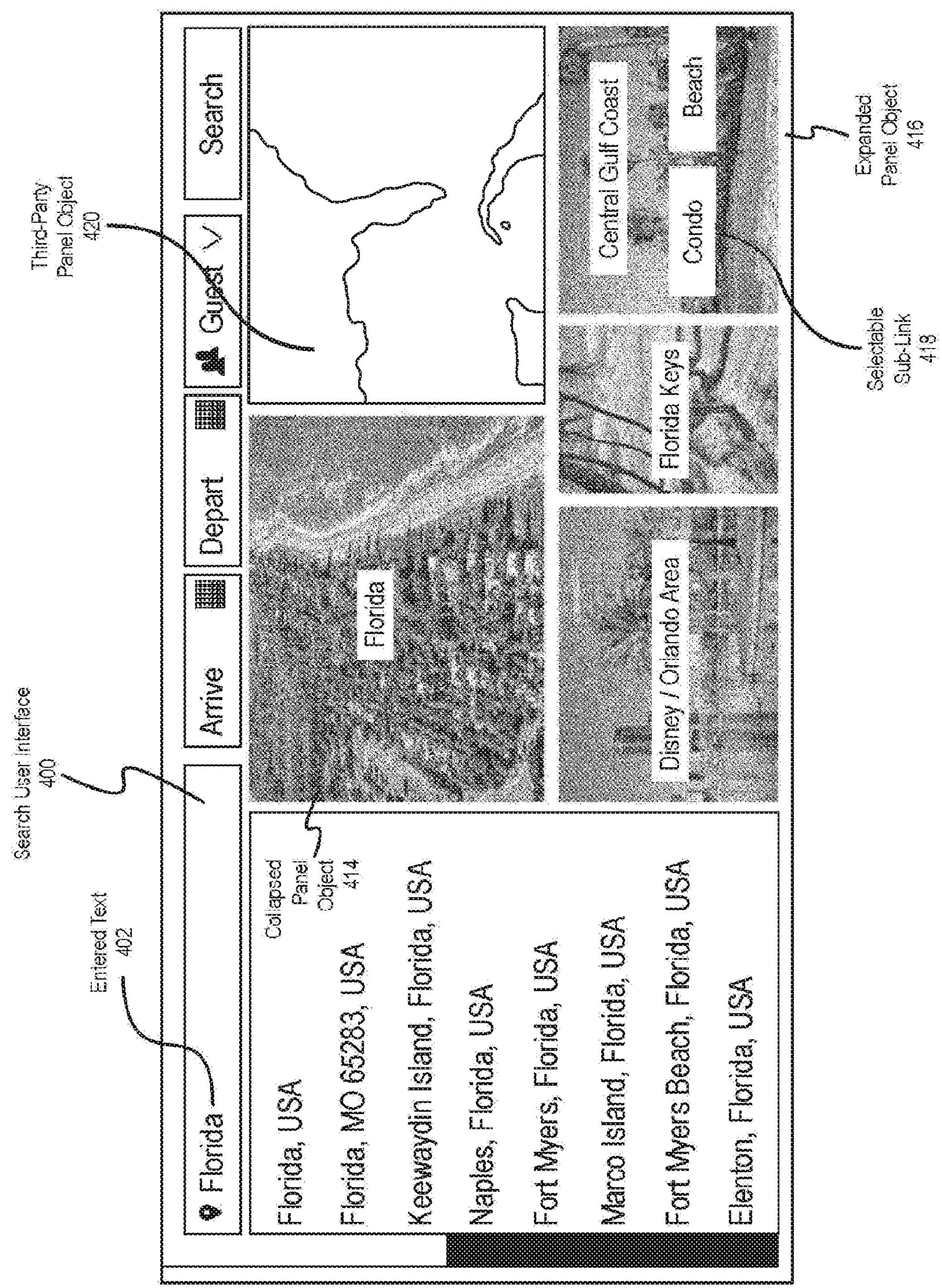

FIG. 4C illustrates a further example screenshot of providing an incremental panel-based search interface in a listing management system, according to an embodiment. Here, the searching user has moved a cursor to another panel object such that the "Florida" panel object is now a collapsed panel object 414. The expanded panel object 416 in this example includes the "Central Gulf Coast" panel object that is associated with two selectable sub-links 418, "Condo" and "Beach." In an embodiment, a third-party panel object 420 may be rendered within the search user interface 400 based on the entered text 402. Here, the third-party panel object 420 comprises map data associated with the entered text 402, a map of Florida as provided by GOOGLE. In other embodiments, a third-party panel object 420 may incorporate third-party data as well as data included in the listing management system 100. For example, popular listings may be presented within the third-party panel object 420. As another example, popular points of interest may be presented within the third-party panel object 420.

Figure 4D:
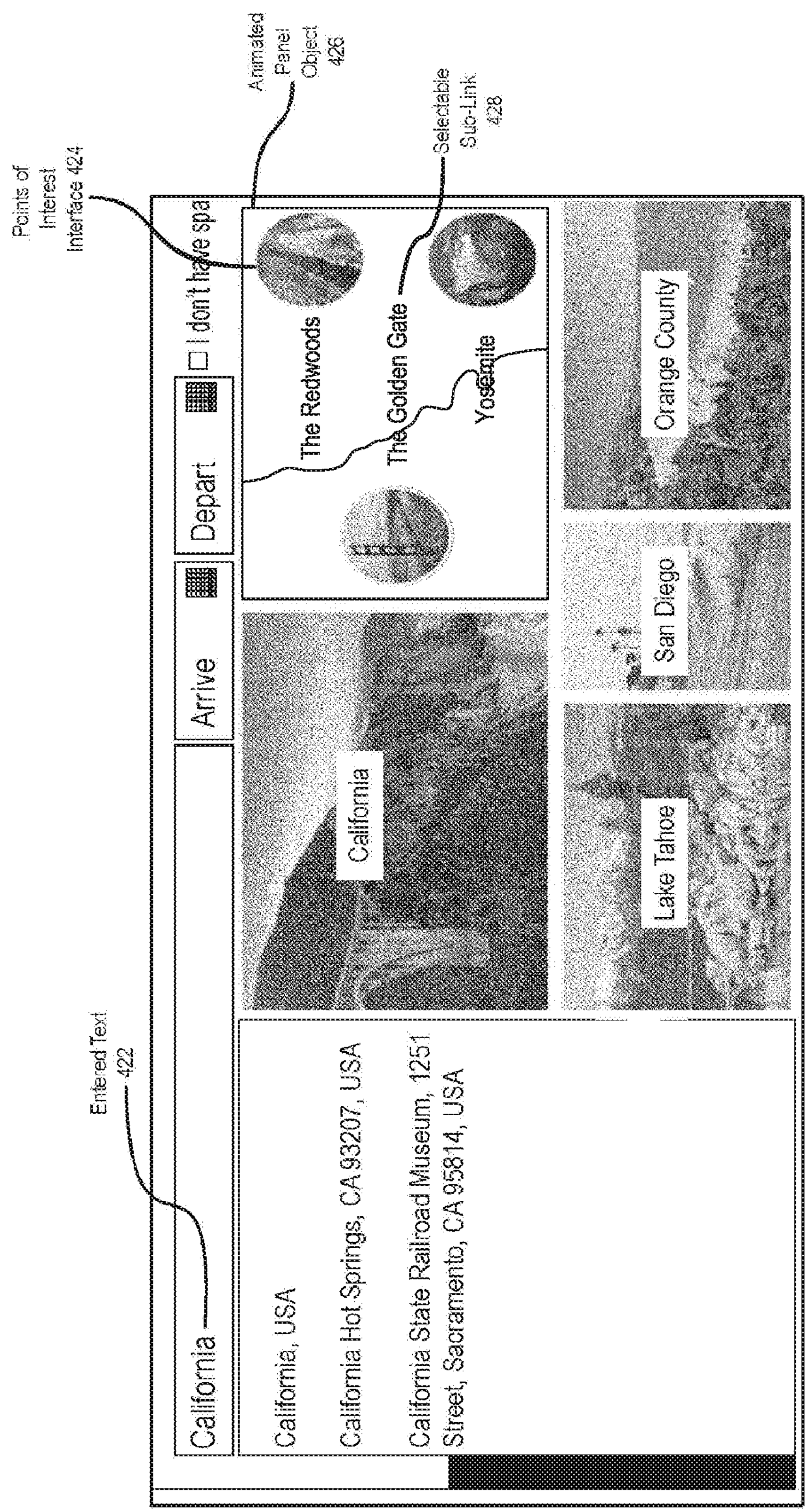

As shown in FIG. 4D, points of interest interface 424 may be included in an animated panel object 426. FIG. 4D illustrates an example screenshot in which "californai" has been inputted as entered text 422. An animated panel object 426 may include three bubbles associated with three popular points of interest. The bubbles may comprise the points of interest interface 424 such that, upon selection of one of the selectable sub-links 428 included in the points of interest interface 424, listings associated with the selected interest may be retrieved and displayed to the searching user. Here, the bubbles include images associated with each interest, including "The Redwoods," "The Golden Gate," and "Yosemite." While circular bubbles are implemented in this example, other shapes may be used in other embodiments. The animated panel object 426 may introduce the bubbles into the panel by various animations, including a pan-zoom, a flyover, and other types of animations.

Figure 5:
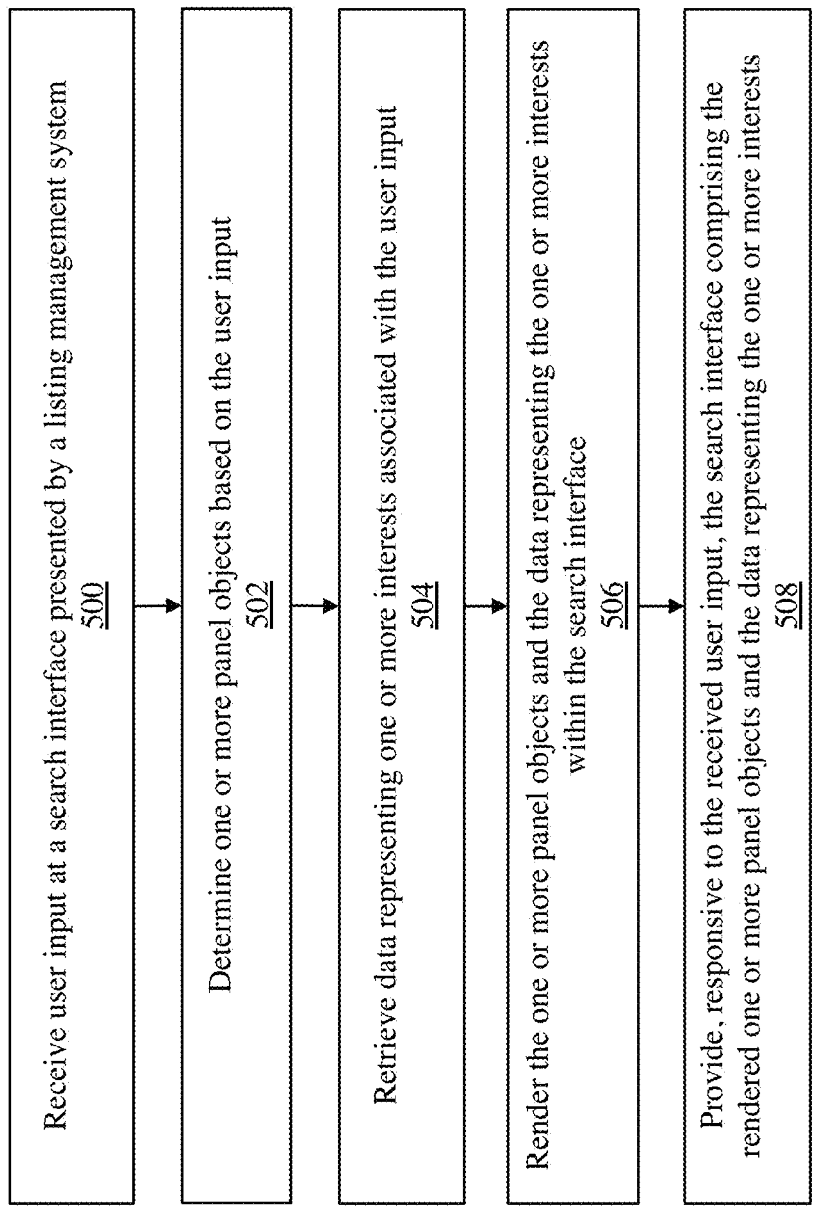
FIG. 5 is a flow chart of a process for providing an incremental panel-based search interface, according to some examples.

FIG. 5 is a flow chart of a process for providing an incremental panel-based search interface, according to some examples. User input is received 500 at a search interface presented by a listing management system. One or more panel objects may be determined 502 based on the user input. Data representing one or more interests associated with the user input is retrieved 504. Then, the one or more panel objects and the data representing the one or more interests are rendered 506 within the search interface. Responsive to the received user input, the search interface comprising the rendered one or more panel objects and the data representing the one or more interests are provided 508.

Figure 6:
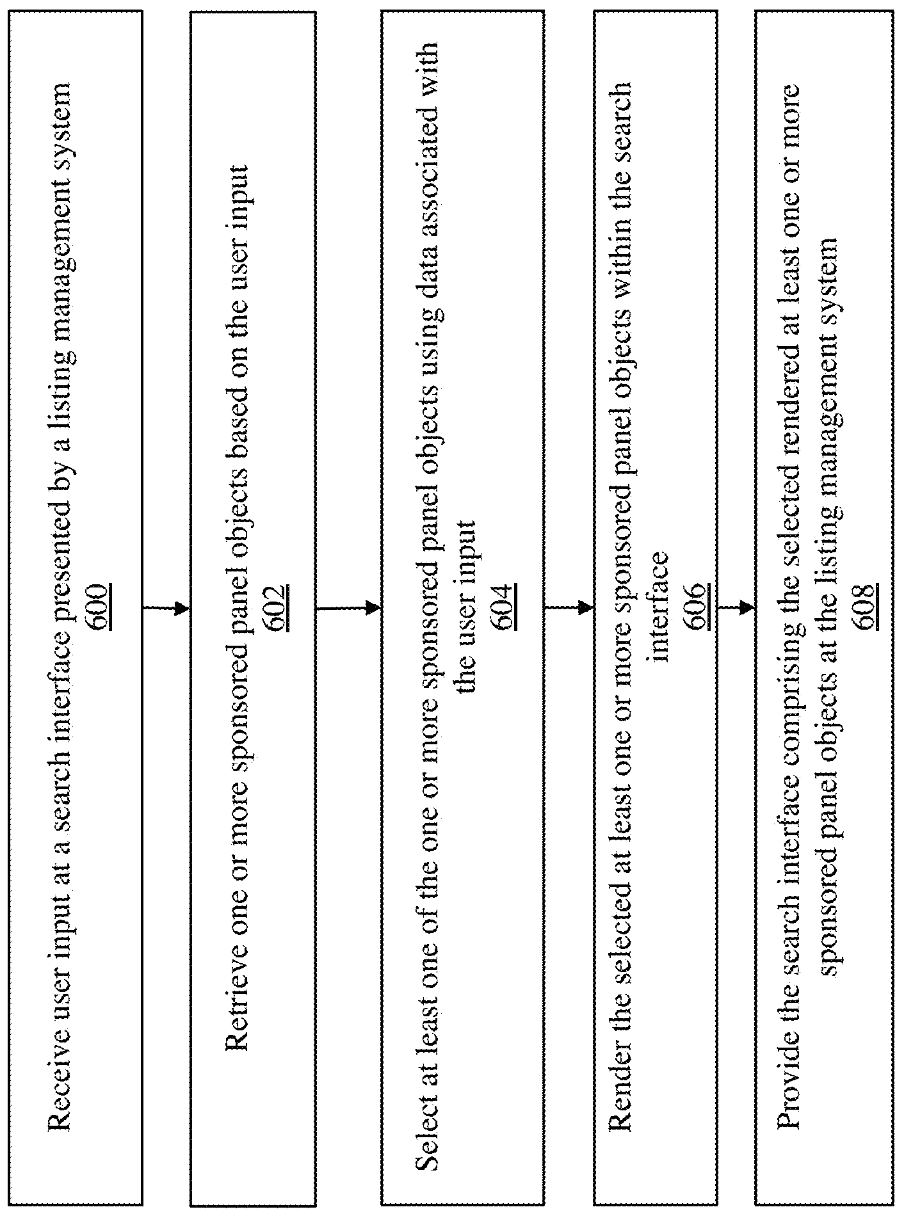
FIG. 6 is a flow chart of a process for providing advertisements in an incremental panel-based search interface, according to some examples.

FIG. 6 is a flow chart of a process for providing advertisements in an incremental panel-based search interface, according to some examples. User input at a search interface presented by a listing management system is received 600. One or more sponsored panel objects are retrieved 602 based on data representing user input. At least one of the one or more sponsored panel objects is selected 604 using data associated with the user input. The selected at least one or more sponsored panel objects are rendered 606 within the search interface. Then, the search interface comprising the selected rendered at least one or more sponsored panel objects is provided 608 at the listing management system.

Figure 7:
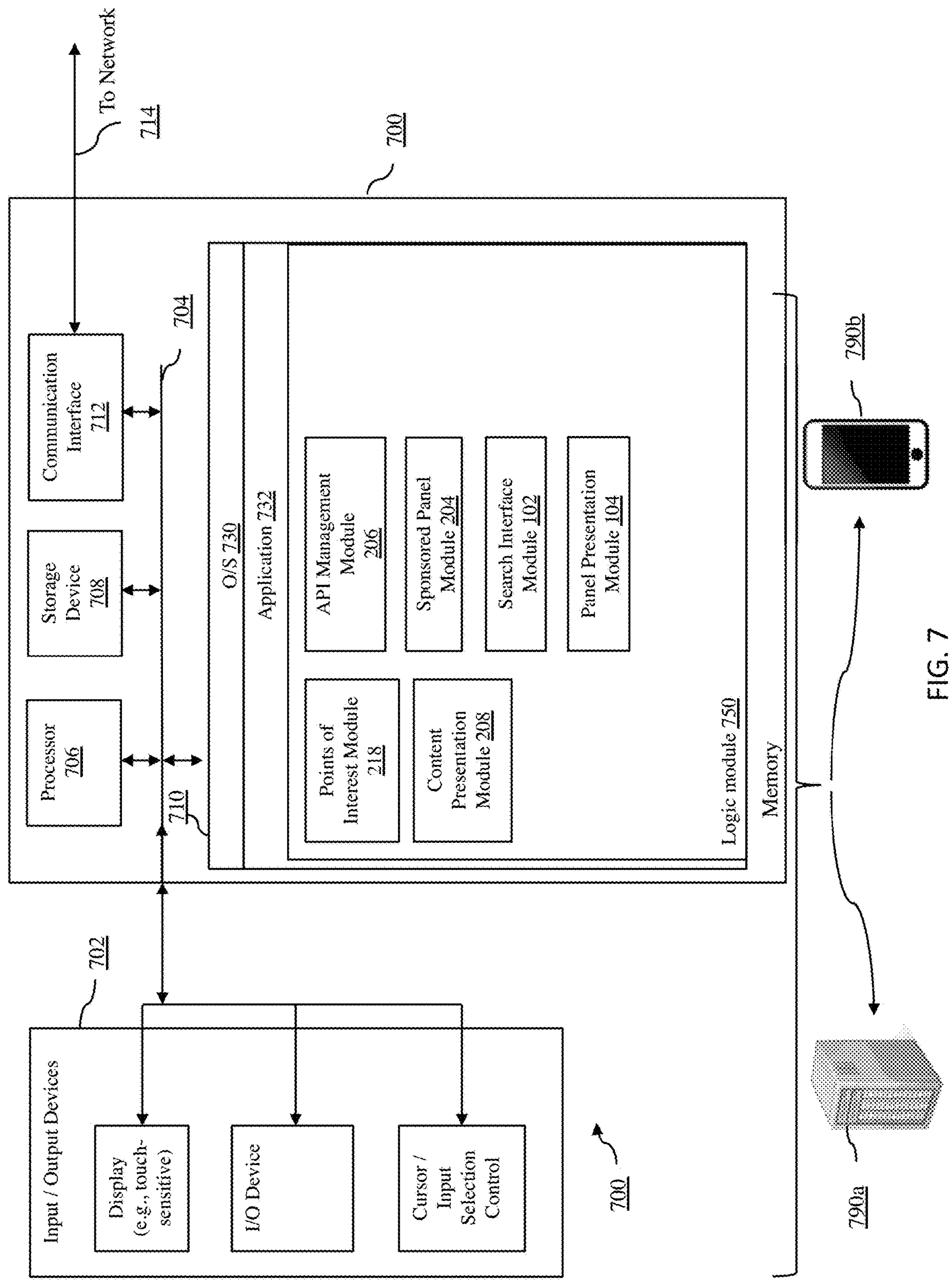
FIG. 7 illustrates an exemplary computing platform disposed in a device configured to provide an incremental panel-based search interface in accordance with various embodiments.

FIG. 7 illustrates an exemplary computing platform disposed in a device configured to provide an incremental panel-based search interface in accordance with various embodiments. In some examples, computing platform 700 may be used to implement computer programs, applications, methods, processes, algorithms, or other software to perform the above-described techniques.

In some cases, computing platform can be disposed in wearable device or implement, a mobile computing device 790*b*, or any other device, such as a computing device 790*a*.

Computing platform 700 includes a bus 704 or other communication mechanism for communicating information, which interconnects subsystems and devices, such as processor 706, system memory 710 (e.g., RAM, etc.), storage device 708 (e.g., ROM, etc.), a communication interface 712 (e.g., an Ethernet or wireless controller, a Bluetooth controller, etc.) to facilitate communications via a port on communication link 714 to communicate, for example, with a computing device, including mobile computing and/or communication devices with processors. Processor 706 can be implemented with one or more central processing units ("CPUs"), such as those manufactured by Intel® Corporation, or one or more virtual processors, as well as any combination of CPUs and virtual processors. Computing platform 700 exchanges data representing inputs and outputs via input-and-output devices 702, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 700 performs specific operations by processor 706 executing one or more sequences of one or more instructions stored in system memory 710, and computing platform 700 can be implemented in a client-server arrangement, peer-to-peer arrangement, or as any mobile computing device, including smart phones and the like. Such instructions or data may be read into system memory 710 from another computer readable medium, such as storage device 708. In some examples, hard-wired circuitry may be used in place of or in combination with software instructions for implementation. Instructions may be embedded in software or firmware. The term "computer readable medium" refers to any tangible medium that participates in providing instructions to processor 706 for execution. Such a medium may take many forms, including but not limited to, non-volatile media and volatile media. Non-volatile media includes, for example, optical or magnetic disks and the like. Volatile media includes dynamic memory, such as system memory 710.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 704 for transmitting a computer data signal.

In some examples, execution of the sequences of instructions may be performed by computing platform 700. According to some examples, computing platform 700 can be coupled by communication link 714 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 700 may transmit and receive messages, data, and instructions, including program code (e.g., application code) through communication link 714 and communication interface 712. Received program code may be executed by processor 706 as it is received, and/or stored in memory 710 or other non-volatile storage for later execution.

In the example shown, system memory 710 can include various modules that include executable instructions to implement functionalities described herein. System memory 710 may include an operating system ("O/S") 730, as well as an application 732 and/or logic module 750. In the example shown, system memory 710 includes a points of interest module 218, a content presentation module 208, a sponsored panel module 204, a search interface module 102, a panel presentation module 104 and an API management module 206. One or more of the modules included in memory 710 can be configured to provide or consume outputs to implement one or more functions described herein.

In at least some examples, the structures, modules, and/or functions of any of the above-described features can be implemented in software, hardware, firmware, circuitry, or a combination thereof. Note that the structures, modules and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, a listing management system or one or more of its components, or any process or device described herein, can be in communication (e.g., wired or wirelessly) with a mobile device, such as a mobile phone or computing device, or can be disposed therein.

In some cases, a mobile device, or any networked computing device (not shown) in communication with an action alert controller or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, a panel presentation module 104 or any of its one or more components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, a listing management system, including one or more components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

One embodiment of the present disclosure includes a computer-implemented method comprising:

under control of a computing device configured with specific computer-executable instructions, receiving a search query through a user interface;

displaying in the user interface a plurality of panel objects determined based at least partly on the search query, the plurality of panel objects corresponding to a first layer of a panel hierarchy and comprising a first panel object related to a first geographic region identified from the search query and a second panel object related to a second geographic region identified from the search query;

receiving user selection of the first panel object;

identifying a plurality of sub-panel objects within a second layer of the panel hierarchy that are related to the first panel object within the panel hierarchy, individual sub-panel objects of the plurality of sub-panel objects relating to individual topics of interest within the first geographic region related to the first panel object, wherein the plurality of sub-panel objects is identified based at least partly on determining whether a number of rental property listings associated with each topic of interest surpasses a predetermined threshold value;

responsive to the user selection of the first panel object, modifying the user interface to display the plurality of sub-panel objects and to reduce a collective size of the plurality of panel objects within the user interface relative to a collective size of the plurality of sub-panel objects within the user interface;

receiving user selection of a first sub-panel object of the plurality of sub-panel objects, the first sub-panel object related to a first topic of interest;

generating a second search query responsive to the user selection of the first sub-panel object, the search query comprising at least a first criterion associated with the geographic region related to the first panel object and a second criterion associated with the topic of interest related to the first sub-panel object; and displaying in the user interface one or more search results associated with the second search query.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method comprising:

under control of a computing device configured with specific computer-executable instructions, receiving a search query through a user interface;

displaying in the user interface a plurality of panel objects determined based at least partly on the search query, the plurality of panel objects corresponding to a first layer of a panel hierarchy and comprising a first panel object related to a first geographic region identified from the search query and a second panel object related to a second geographic region identified from the search query;

receiving user selection of the first panel object;

identifying a plurality of sub-panel objects within a second layer of the panel hierarchy that are related to the first panel object within the panel hierarchy, individual sub-panel objects of the plurality of sub-panel objects relating to individual topics of interest within the first geographic region related to the first panel object, wherein the plurality of sub-panel objects is identified based at least partly on determining whether a number of rental property listings associated with each topic of interest surpasses a predetermined threshold value;

responsive to the user selection of the first panel object, modifying the user interface to display the plurality of sub-panel objects and to reduce a collective size of the plurality of panel objects within the user interface relative to a collective size of the plurality of sub-panel objects within the user interface;

receiving user selection of a first sub-panel object of the plurality of sub-panel objects, the first sub-panel object related to a first topic of interest;

generating a second search query responsive to the user selection of the first sub-panel object, the search query comprising at least a first criterion associated with the geographic region related to the first panel object and a second criterion associated with the topic of interest related to the first sub-panel object; and displaying in the user interface one or more search results associated with the second search query.

2. The computer-implemented method of claim 1, wherein the first panel object comprises an image file associated with the first geographic region.

3. The computer-implemented method of claim 1, wherein the topics of interest are based at least partly on demographic information about a user.

4. The computer-implemented method of claim 1, wherein the search query comprises a plurality of characters and is associated with the first geographic region and the second geographic region based at least partly on the plurality of characters matching at least one of the first geographic region and second geographic region.

5. The computer-implemented method of claim 1, wherein a first display size for the first panel object within the user interface is determined based at least partly on a number of characters associated with the first geographic region, and wherein a second display size for the second panel object within the user interface is determined based at least partly on a number of characters associated with the second geographic region.

6. A system comprising:

a data store including computer-executable instructions; and a processor in communication with the data store, the processor configured to execute the computer-executable instructions to at least:

receive a search query through a user interface;

display in the user interface a plurality of panel objects determined based at least partly on the search query, the plurality of panel objects corresponding to a first layer of a panel hierarchy and comprising a first panel object related to a first geographic region identified from the search query and a second panel object related to a second geographic region identified from the search query;

receive a user selection of a first panel object;

identify a plurality of sub-panel objects within a second layer of the panel hierarchy that are related to the first panel object within the panel hierarchy, individual sub-panel objects of the plurality of sub-panel objects relating to individual topics of interest within the first geographic region related to the first panel object, wherein processor is configured to identify the plurality of sub-panel objects based at least partly by determining whether a number of rental property listings associated with each topic of interest surpasses a predetermined threshold value;

responsive to the user selection of the first panel object, modify the user interface a plurality of sub-panel objects and to reduce a collective size of the plurality of panel objects within the user interface relative to a collective size of the plurality of sub-panel objects within the user interface;

receive user selection of a first sub-panel object of the plurality of sub-panel objects, the first sub-panel object related to a first topic of interest;

generate a second search query responsive to the user selection of the first sub-panel object, the search query comprising at least a first criterion associated with the geographic region related to the first panel object and a second criterion associated with the topic of interest related to the first sub-panel object; and display in the user interface one or more search results associated with the second search query.

7. The system of claim 6, wherein the first panel object comprises an image file associated with the first geographic region.

8. The system of claim 6, wherein the topics of interest are determined based at least partly on demographic information about a user.

9. The system of claim 6, wherein the search query comprises a plurality of characters and is associated with the first geographic region and the second geographic region based at least partly on the plurality of characters matching at least one of the first geographic region and second geographic region.

10. The system of claim 6, wherein a first display size for the first panel object is determined based at least partly on a number of characters associated with the first geographic region, and wherein a second display size for the second panel object is determined based at least partly on a number of characters associated with the second geographic region.

11. A non-transitory computer-readable medium comprising computer executable instructions that when executed by a computing system cause the computing system to at least:

receive a search query through a user interface;

display in the user interface a plurality of panel objects determined based at least partly on the search query, the plurality of panel objects corresponding to a first layer of a panel hierarchy and comprising a first panel object related to a first geographic region identified from the search query and a second panel object related to a second geographic region identified from the search query;

receive user selection of the first panel object;

identify a plurality of sub-panel objects within a second layer of the panel hierarchy that are related to the first panel object within the panel hierarchy, individual sub-panel objects of the plurality of sub-panel objects relating to individual topics of interest within the first geographic region related to the first panel object, wherein identifying the plurality of sub-panel objects is based at least partly on determining whether a number of rental property listings associated with each topic of interest surpasses a predetermined threshold value;

responsive to the user selection of the first panel object, modify the user interface a plurality of sub-panel objects and to reduce a collective size of the plurality of panel objects within the user interface relative to a collective size of the plurality of sub-panel objects within the user interface;

receive user selection of a first sub-panel object of the plurality of sub-panel objects, the first sub-panel object related to a first topic of interest;

generate a second search query responsive to the user selection of the first sub-panel object, the search query comprising at least a first criterion associated with the geographic region related to the first panel object and a second criterion associated with the topic of interest related to the first sub-panel object; and display in the user interface one or more search results associated with the second search query.

12. The non-transitory computer-readable medium of claim 11, wherein the first panel object comprises an image file associated with the first geographic region.

13. The non-transitory computer-readable medium of claim 11, wherein the topics of interest are based at least partly on demographic information about a user.

14. The non-transitory computer-readable medium of claim 11, wherein the search query comprises a plurality of characters and is associated with the first geographic region and the second geographic region based at least partly on the plurality of characters matching at least one of the first geographic region and second geographic region.

15. The non-transitory computer-readable medium of claim 11, wherein a first display size for the first panel object is determined based at least partly on a number of characters associated with the first geographic region, and wherein a second display size for the second panel object is determined based at least partly on a number of characters associated with the second geographic region.

* * * * *